United States Patent
Bechtold et al.

(10) Patent No.: US 7,542,860 B2
(45) Date of Patent: Jun. 2, 2009

(54) METHOD AND DEVICE FOR DETECTING THE LOCATION OF A PULSE-TYPE MECHANICAL EFFECT ON A SYSTEM PART

(75) Inventors: Bela Bechtold, Möhrendorf (DE); Peter Jax, Erlangen (DE); Vojtech Ocelik, Erlangen (DE); Jan Zach, Erlangen (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 12/175,472

(22) Filed: Jul. 18, 2008

(65) Prior Publication Data

US 2008/0288187 A1    Nov. 20, 2008

Related U.S. Application Data

(63) Continuation of application No. PCT/EP2007/000134, filed on Jan. 10, 2007.

(30) Foreign Application Priority Data

Feb. 3, 2006    (DE) .................. 10 2006 004 941

(51) Int. Cl.
  *G01R 23/00*  (2006.01)
  *H03F 1/26*   (2006.01)
(52) U.S. Cl. ...................... 702/78; 702/52; 702/56; 702/189; 73/660
(58) Field of Classification Search .............. 702/40, 702/52, 54, 56, 78, 183, 185, 189; 73/660; 60/204, 223, 779; 381/94.3; 342/192; 340/683
See application file for complete search history.

(56) References Cited

U.S. PATENT DOCUMENTS

| | | | |
|---|---|---|---|
| 3,875,381 A | 4/1975 | Wingfield et al. |
| 4,888,948 A | 12/1989 | Fisher et al. |
| 5,479,826 A | 1/1996 | Twerdochlib et al. |
| 5,521,840 A | 5/1996 | Bednar |
| 6,208,944 B1 | 3/2001 | Franke et al. |
| 6,301,572 B1 | 10/2001 | Harrison |

(Continued)

FOREIGN PATENT DOCUMENTS

DE        2223321 C2    1/1974

(Continued)

*Primary Examiner*—John H Le
(74) *Attorney, Agent, or Firm*—Laurence A. Greenberg; Werner H. Stemer; Ralph E. Locher (57) ABSTRACT

A method and device detect a position of a pulsed mechanical effect on a plant component. An operating noise in the plant component is continuously recorded by sensors which are arranged on the plant component and converted by the above into a measured signal. The measured signals of the sensors undergo a transformation in a first time window. A first evaluation function is derived from a plurality of first transformations determined in this manner, the evaluation functions display an appearance of the pulsed mechanical effect. Accordingly, when detecting an effect following the second shorter time window having the same algorithms, second transformed and respectively, second evaluation functions are derived, from which, respectively, one time point is determined. Wherein the sound signal produced by the effect impacts upon the sensor. From there, running time differences produced between the sensors can be exactly reconstructed on the position of the effect.

14 Claims, 6 Drawing Sheets

U.S. PATENT DOCUMENTS

| | | |
|---|---|---|
| 6,494,046 B1 | 12/2002 | Hayess |
| 6,499,350 B1 | 12/2002 | Board et al. |
| 6,907,368 B2 | 6/2005 | Bechtold et al. |
| 2001/0023582 A1 | 9/2001 | Nagel |
| 2005/0249362 A1 | 11/2005 | Steinberg et al. |

FOREIGN PATENT DOCUMENTS

| | | |
|---|---|---|
| DE | 19545008 C2 | 6/1997 |
| DE | 19727114 C2 | 2/1999 |
| DE | 19843615 C2 | 4/2000 |
| DE | 19857552 A1 | 6/2000 |
| GB | 2288235 A | 10/1995 |
| WO | 9535484 | 4/1997 |
| WO | 0175272 A2 | 10/2001 |
| WO | 03071243 A1 | 8/2003 |
| WO | 2004040246 A1 | 5/2004 |

$$t = t_1 : \underline{A}_{1,s}(f_{1,i}, t_1) = \{A_{1,s}(f_{1,i}, t_1 - \tfrac{M-1}{2}\delta t_1), A_{1,s}(f_{1,i}, t_1 - \tfrac{M-3}{2}\delta t_1), \ldots$$
$$\ldots, A_{1,s}(f_{1,i}, t_1 + \tfrac{M-1}{2}\delta t_1)\}$$

METHOD AND DEVICE FOR DETECTING THE LOCATION OF A PULSE-TYPE MECHANICAL EFFECT ON A SYSTEM PART

CROSS-REFERENCE TO RELATED APPLICATION

This is a continuing application, under 35 U.S.C. § 120, of copending international application No. PCT/EP2007/000134, filed Jan. 10, 2007, which designated the United States; this application also claims the priority, under 35 U.S.C. § 119, of German patent application No. DE 10 2006 004 941.1, filed Feb. 3, 2006; the prior applications are herewith incorporated by reference in their entirety.

BACKGROUND OF THE INVENTION

Field of the Invention

The invention relates to a method and to a device for detecting the location of a pulse-type mechanical effect on a system part.

There is a need in a multiplicity of applications to monitor continuously the proper operation of a system part, for example a pipeline or a container in chemical process engineering or a fluid-flow machine, in order to detect disturbances in good time and to avoid serious consequential damage. A multiplicity of methods for such monitoring are known in the prior art.

European patent EP 0 765 466 B1, corresponding to U.S. Pat. No. 5,479,826, proposes, for example, to undertake the monitoring of the vibrations of turbine blades with the aid of microwaves that are directed onto the turbine blades. Conclusions may be drawn on the turbine's state of vibration from the modulation of the microwaves reflected at the turbine blades.

In the method known from published, non-prosecuted German application DE 198 57 552 A1, corresponding to U.S. Pat. No. 6,494,046, the rupture of the shaft of a turbine is detected by measuring the rotational frequencies at the ends of the shaft.

It is proposed in German patent DE 198 43 615 C2 to undertake the diagnosis of the state of a combustion drive with the aid of an analysis of the frequency spectrum of the measurement signals that are picked up with the aid of a sound pickup arranged in the air inlet region or exhaust gas region.

In German patent DE 197 27 114 C2, corresponding to U.S. Pat. No. 6,208,944, a machine is monitored by detecting the signals of structure-borne sound striking it, instead of the air noise. In this known method, as well, there is an analysis of the respectively determined frequency spectra of the measurement signals detected by the structure-borne sound pickup.

In the case of the method disclosed in German patent DE 195 45 008 C2, as well, the frequency spectrum of the measurement signal detected by a monitoring sensor, for example an acceleration pickup, is analyzed during the operation of the machine and compared with a reference frequency spectrum.

An analysis of the frequency spectrum of the signals of structure-borne sound picked up at a turbine is also undertaken in the case of the method disclosed in U.S. Pat. No. 6,301,572 B1. To this end, the Fourier transforms of the measurement signal are analyzed in a neural network with the aid of rules of fuzzy logic, in order in this way to obtain information relating to the state of the turbine.

A particular problem is represented by loose parts that are entrained by the flow and strike the system part and which cause only a pulse-type, short-term effect that is correspondingly problematic to demonstrate reliably.

It is proposed in British patent GB 2 288 235 to detect the occurrence of loose parts that are entrained in a flowing medium by use of the vibrations produced when the parts strike a system part. To this end, a sound pickup is arranged on the system part and the measurement signals generated by it are fed to an adaptive neural network that can decide with the aid of the patterns occurring whether normal background noise is present, or not.

The problems associated with the occurrence of loose parts in a flowing medium can, for example, arise with gas turbines whose combustion chambers are lined with ceramic tiles for protection against overheating. These ceramic tiles are subjected to high dynamic loads by alternating pressure fluctuations occurring in the combustion chamber. It can happen in this case that portions of the tiles on the respective holders break away, are entrained by the flow of the exhaust gas and strike the first guide-blade row of the gas turbine. This can lead to damage to the coating of the guide blades, and to destruction of the moving blades arranged there behind. Moreover, there is the risk of a tile already damaged by the breaking away of portions becoming completely detached from the holders and possibly causing correspondingly massive damage to the gas turbine. In this case, the occurrence of small loose parts or an individual tile indicates an impending total breaking away of a tile or a number of tiles, and so switching off the gas turbine in good time and exchanging the damaged tiles in good time prevent more extensive damage.

In order to be able to ascertain the intrusion of foreign parts into a gas turbine, in U.S. Pat. No. 4,888,948 there is arranged at the inlet of the turbine a sensor with the aid of which an electric charge induced by the foreign bodies is detected.

It is also known in principle from international patent publication WO 01/75272 A2 for the purpose of monitoring such impacts on a system part to make use of suitable sensors to detect the impact by structure-borne sound thereby produced, just as in the case of the method known from British patent GB 2 288 235. However, particularly in the case of gas turbines, the problem arises here that the normal levels of operating noise are so high that even the signal component generated at the sensor by the impact of a whole tile on the guide blade of the gas turbine is smaller than the background generated by the normal operating noises, and so, in particular, the occurrence of relatively small portions cannot be detected by simply monitoring the amplitudes of the signals of structure-borne sound. It is therefore proposed in this publication for the purpose of improving the signal-to-noise ratio to subject the measurement signal picked up by a measuring sensor to bandpass or high-pass filtering in order in this way to eliminate the signals of structure-borne sound produced in normal operation of the turbine. These measures are not, however, sufficient for reliably identifying a pulse-type event in the case of high background noises that vary temporally.

There is known from international patent disclosure WO 03/071243 A1 a method for detecting a pulse-type mechanical device on a system part in the case of which the detected structure-borne sound signal is subjected to a windowed Fourier transformation. The algorithms explained there in more detail are used to derive from a multiplicity of Fourier spectra determined in this way an evaluation function K that indicates the occurrence of a pulse-type mechanical effect on the system part. The algorithm, specified in this publication, for deriving the evaluation function K enables the precise detection of a signal component that is superposed on the noisy measurement signal and is to be ascribed to a pulse-type effect.

Particularly in the case of large-volume system parts having a multiplicity of components installed therein, in addition to the information that such a pulse-type mechanical effect not belonging to the normal operating noise has taken place, it is also important to ascertain the location at which this effect has taken place in the system part. It is known in principle for this purpose to fit a plurality of sensors at different locations on the system part, and to infer the location of the effect from the time differences between the events respectively detected by the individual sensors and the speed of sound in the system part. The location of the effect is also of interest in turbine monitoring in order to be able to judge whether there is tile flight (a detached tile striking the guide-blade carrier or an outer shell of the combustion chamber space), or whether the pulse-type effect is caused by operationally induced frictional processes from other regions of the turbine.

An exact determination of the location of an effect requires that the beginning of the event be respectively determined as exactly as possible from the time windows in which the event is respectively detected in the sensors.

It is known from German patent DE 22 23 321 C2 to detect the occurrence of a crack and its location with the aid of a plurality of piezoelectric transducers arranged on the system part. The time differences between the maxima of the signals received by the transducers are evaluated for this purpose.

SUMMARY OF THE INVENTION

It is accordingly an object of the invention to provide a method and a device for detecting the location of a pulse-type mechanical effect on a system part which overcome the above-mentioned disadvantages of the prior art methods and devices of this general type.

In the case of the method for detecting the location of a pulse-type mechanical effect on a system part, an operating noise present in the system part is detected continuously by a plurality of sensors arranged on the system part and is converted by them into a measurement signal. The following method steps are provided for analyzing the measurement signals: a) the measurement signals are respectively stored in time intervals for a time range, b) a first magnitude of the transform of each measurement signal is determined with the aid of prescribed first parameters of a mathematical transformation rule in first time windows that are temporally sequential in first time steps and lie within the time range, c) a first evaluation function is respectively derived for each first time step from the first magnitudes determined for each of the prescribed first parameters, d) the first evaluation functions are respectively compared with a first threshold value, and the overshooting of the first threshold value by at least one of the first evaluation functions at a triggering instant is valued as an index for the presence of a pulse-type signal component indicating the mechanical effect, e) second evaluation functions are determined with the aid of prescribed second parameters of the mathematical transformation rule and with the same algorithms in second time windows that are temporally sequential in second time steps and lie within the time range, and which are smaller than the first time windows, and f) the location of the effect is determined from the instants at which the second evaluation functions respectively fulfill a prescribed criterion, and from the propagation time differences resulting therefrom.

In this case, the invention is based on the consideration that the sensitivity with which a pulse-type effect can be detected depends substantially on the size of the time window and should overshoot the time duration of a typical burst, although it is impermissible for this overshooting to be excessively large so that the time window is still of the order of magnitude of the time duration of the burst (time duration<time window<ten times the time duration). However, a large time window has the disadvantage that the evaluation function changes only very slowly and so the instant of the effect, that is to say the beginning of the burst signal, can be determined only relatively imprecisely. If a burst signal is identified in one of the channels, and the evaluation function is recalculated with the aid of a significantly smaller time window, the time constant with which the evaluation function changes is correspondingly reduced, and it is possible to make a more precise determination of its rising instant and thus of the instant of the effect.

In accordance with an added mode of the invention, there is the step of setting the second time steps to be shorter than the first time steps.

In accordance with another mode of the invention, there is the step of determining for each of the first time steps and each of the prescribed first parameters, a deviation of the first magnitudes from a first mean magnitude, and a mean deviation assigned to this from which the first evaluation function is derived for each of the prescribed first parameters and for each of the first time steps, and in which a calculation of the second evaluation function is based both on a second mean magnitude valid for the triggering instant for the prescribed second parameters and on the mean deviation assigned to said second mean magnitude.

In accordance with a further feature of the invention, the prescribed criterion is fulfilled with the second evaluation functions respectively overshooting a second threshold value.

In accordance with another further feature of the invention, the prescribed criterion is fulfilled when a first derivative of the second evaluation function overshoots a difference threshold value.

In accordance with a further added mode of the invention, there is the step of deriving the difference threshold value from a maximum gradient of a rising edge of the second evaluation function.

In accordance with yet another mode of the invention, there is the step of determining the difference threshold value with an aid of relationship $DK_{0,s} = \beta DK_{max,s}$, in which case $0.05 \leq \beta \leq 0.2$.

In the case of a device for detecting a location of a pulse-type mechanical effect on a system part, the device contains a plurality of sensors disposed on the system part, for continuously detecting and measuring an operating noise present in the system part; at least one A/D converter, connected downstream of the sensors, for digitizing measurement signals detected by the sensors; and an arithmetic unit connected to and receiving the digitized measurement signals from the A/D converter. The arithmetic unit is programmed to store the measurement signals respectively in time intervals for a time range; determine a first magnitude of a transform of each of the measurement signals with an aid of the prescribed first parameters of a mathematical transformation rule in first time windows that are temporally sequential in first time steps and lie within the time range; derive a first evaluation function respectively for each of the first time step from the first magnitude determined for each of the prescribed first parameters resulting in first evaluation functions; compare the first evaluation functions respectively with a first threshold value, and an overshooting of the first threshold value by at least one of the first evaluation functions at a triggering instant is valued as an index for a presence of a pulse-type signal component indicating the mechanical effect; determine second evaluation functions with an aid of prescribed second parameters of the mathematical transformation rule and with the same algorithms in second time windows that are temporally sequential in second time steps and lie within the time range, and which are smaller than the first time windows; and determine the location of an effect from instants at which the second evaluation functions respectively fulfill a prescribed criterion, and from propagation time differences resulting therefrom.

Other features which are considered as characteristic for the invention are set forth in the appended claims.

Although the invention is illustrated and described herein as embodied in a method and a device for detecting the location of a pulse-type mechanical effect on a system part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
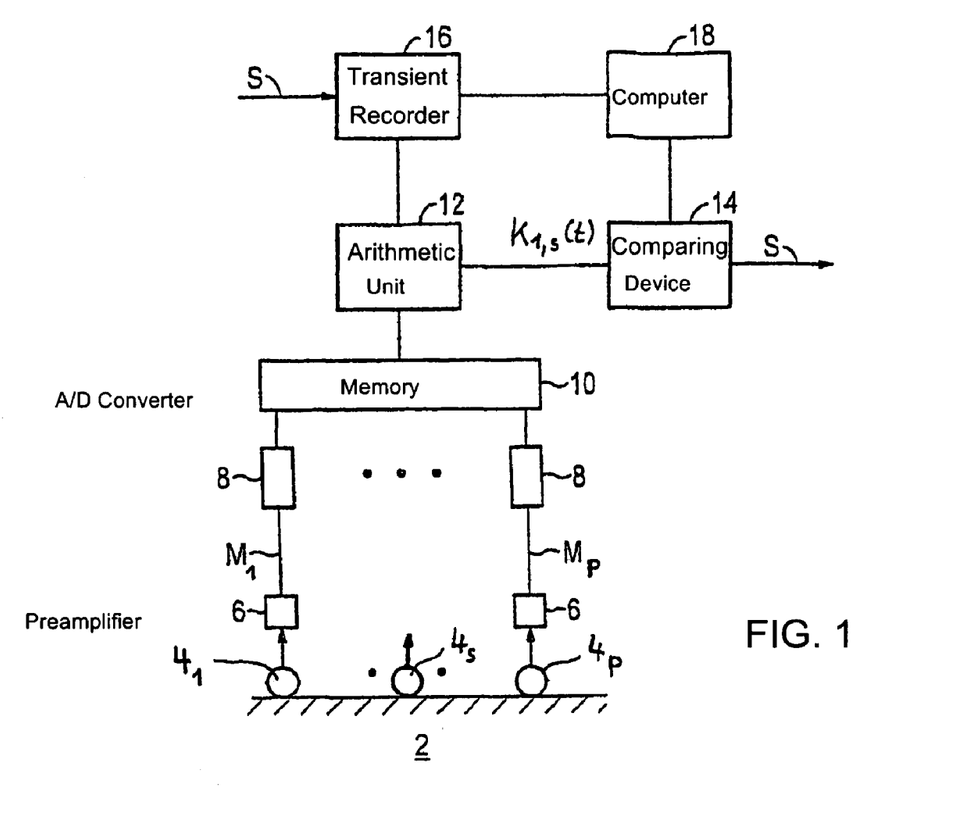
FIG. 1 is a schematic diagram showing an exemplary embodiment of a device in accordance with the invention.

Referring now to the figures of the drawing in detail and first, particularly, to FIG. 1 thereof, there is shown arranged on a system part 2, for example, a gas turbine, a plurality P of measuring pickups or sensors $4_1, \ldots 4_s, \ldots 4_P$, in particular piezoelectric acceleration pickups, that respectively continuously detect in a number of measuring channels the operating noise present in the system part 2 and propagating in the form of structure-borne sound. The sensors $4_s$ respectively convert the structure-borne sound signals into an electric measurement signal $M_s$ that is amplified in a preamplifier 6 and is relayed to an analog/digital converter 8 that is connected to a digital memory 10. The amplified measurement signal $M_s$ respectively present is digitized, buffered and relayed for further processing to an arithmetic unit 12 in which the evaluation algorithm according to the invention is implemented.

The arithmetic unit 12 includes for each measuring channel a processor for a fast calculation of a transform of the data relayed by the analog/digital converter 8, as well as a ring memory for storing a number L of transforms determined by the transformation. This transformation can be, for example, a fast windowed Fourier transformation FFT. Any mathematical operation with which it is possible to represent a representation of this mathematical function with the aid of a complete set of orthogonal base functions is to be understood as a transformation of the function (the measurement signal $M_s(t)$) in the meaning of the present invention. As is the case with the Fourier transformation—these orthogonal base functions can be formed by the exponential function $e^{-i\omega t}$. However, it is also possible in principle to use other periodic functions as orthogonal base system. These transformations are used to calculate discrete transforms with the aid of a predetermined set of discrete parameters. In the case of Fourier transformation, these are permanently prescribed frequencies $f_i = \omega_i/2\pi$ that are selected in accordance with the respective system part, as is explained in more detail for a turbine, for example, in international patent disclosure WO 03/071243.

For each measuring channel, an algorithm implemented in the arithmetic unit 12 and explained in more detail below employs the discrete transforms determined in the arithmetic unit 12 to determine first evaluation function $K_{1,s}(t)$ dependent on time t that is compared in a comparing device 14 with a prescribed first threshold value $K_{1,0}$. An overshooting of the first threshold value $K_{1,0}$ (alarm threshold) in one of the channels (for one of the measurement signals $M_s$) serves as index for the presence in this channel of a pulse-type signal component caused by a transient mechanical effect, and generates a corresponding trigger signal S. The trigger signal S is fed to a transient recorder 16 in which the data determined in the arithmetic unit 12 for a time range of 10 s, for example, is recorded and relayed to an evaluation computer 18 in order that the latter can be used to carry out an analysis (explained subsequently) of the measurement signals $M_s(t)$ that enables the location of the pulse-type effect to be inferred from the difference between the instants $t_s$ (propagation time differences) in which the occurrence of an event is respectively recorded in the channels, from knowledge of the geometry of the system part, from the position of the sensors and from the speed of sound.

Figure 2:
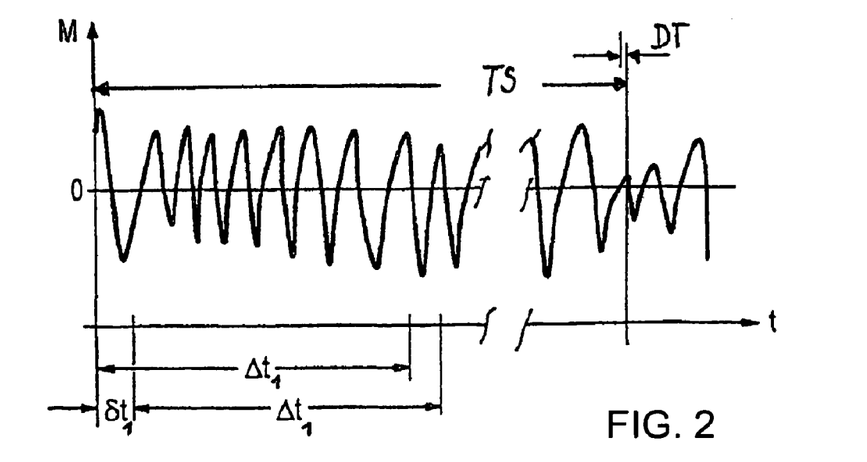
FIG. 2 is a simplified diagram in which a measurement signal M is plotted against time t with higher temporal resolution.

FIG. 2 uses a schematic sketch to explain the first step of the mode of procedure implemented in the arithmetic unit 12 (FIG. 1). The measurement signal $M_s$ digitized in each channel with a high clock rate (typically 80-100 kHz) (and illustrated in analog fashion in FIG. 2 for reasons of clarity) is respectively stored for a time range TS (typically approximately 10 s) in a time interval DT (typically approximately 0.01-0.0125 ms in accordance with the clock rate), and updated in accordance with the clock rate. In a first time window $\Delta t_1$ within the time range TS, the digitized measurement signal $M_s$ is subjected to a fast discrete Fourier transformation. Subsequently, the first time window $\Delta t_1$ is displaced by a first time step $\delta t1$, and a Fourier transformation is carried out anew in an overlapping first time window $\Delta t1$ of the same length. In the exemplary embodiment, $\Delta t_1$=25.6 ms and $\delta t_1$=3.2 ms. In this way, time-dependent first magnitudes $A_{1,s}(f_{1,i},t)$ are determined for each first time window $\Delta t_1$ and for a finite number of first discrete frequencies $f_{1,i}$.

Figure 3:
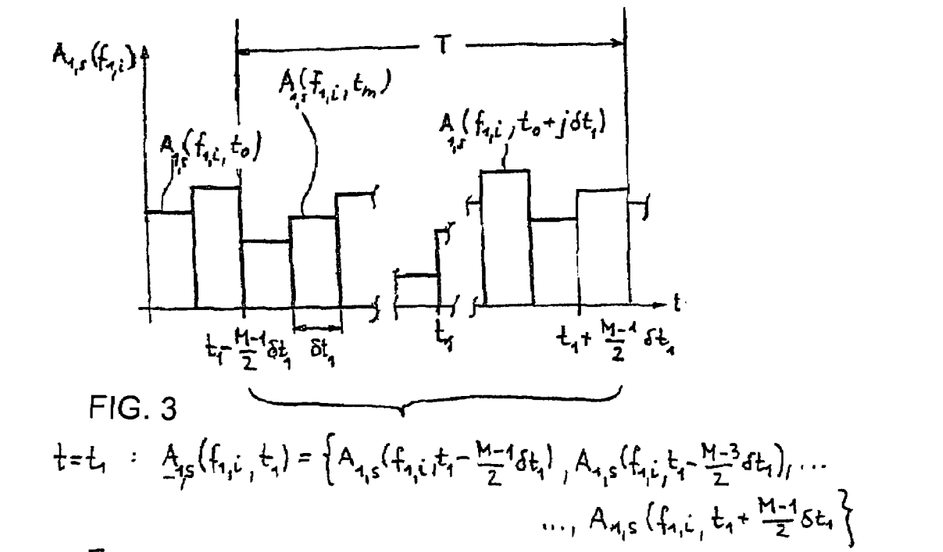
FIG. 3 is a graph in which a magnitude A of a frequency spectrum determined from the measurement signal by a fast Fourier transformation is plotted against time t for a prescribed frequency fi.

In FIG. 3 the time profile of the first magnitude $A_{1,s}(f_{1,i},t)$ for a prescribed frequency $f_{1,i}$ is illustrated. It may be gathered from FIG. 3 that the magnitude $A_{1,s}(f_{1,i},t)$ varies with time for this prescribed frequency $f_{1,i}$. The time interval plotted in FIG. 3 is the first time step $\delta t1$ in which the fast Fourier transformation is updated. In accordance with the invention, the associated first value of the magnitude $A_{1,s}(f_{1,i},t_j)$ where $t_j=t_0+j\delta t_1$, j being a natural number, is determined for a multiplicity N of prescribed first frequencies $f_{1,i}$ or frequency ranges and in temporally sequential first time steps $\delta t_1$ for temporally overlapping first time windows $\Delta t_1$.

Figure 4:
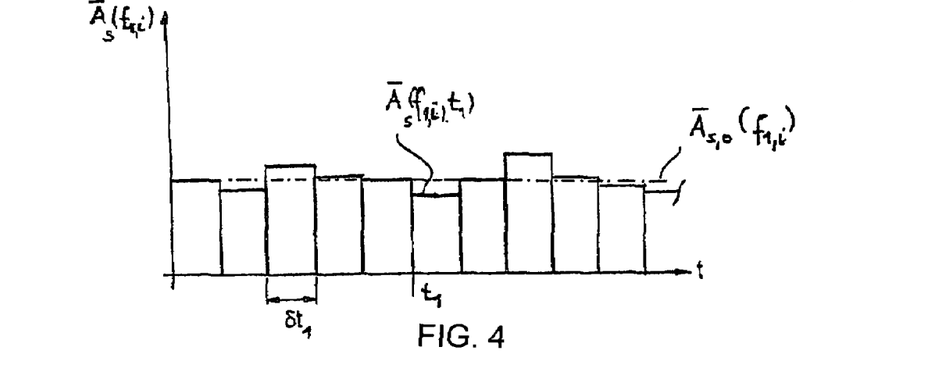
FIG. 4 is a graph in which a sliding time mean A of magnitudes of the spectrum is likewise plotted against time t for the prescribed frequency fi.

A mean magnitude $\overline{A}_s$ formed for this first frequency $f_{1,i}$ is now subtracted from the first value of the magnitude $A_{1,s}(f_{1,i},t)$ obtained in this way. The suitable algorithms for determining the mean magnitude $\overline{A}_s$ are a function of the system part to be monitored and the complexity of the operating noises to be expected. In simple operating situations, it is sufficient to use a permanently prescribed constant mean magnitude $\overline{A}_{s,0}(f_{1,i})$. It is more favorable to determine a temporally variable mean magnitude $\overline{A}_s(f_{1,i},t)$ in a sliding fashion, as is illustrated in FIG. 4. The use of a sliding mean magnitude $\overline{A}_s(f_{1,i},t)$ is advantageous, in particular, when monitoring system parts in the case of which there can be random changes in state in which the system part changes from one operating state into another, and the operating or background noise can rise or fall very quickly to a clearly different level. The start of a so-called hum is such a change in state, in the case of a turbine, for example. This is caused by the arrangement of the flames in an annular space, which can have the result that the entire combustion chamber is excited to sympathetic vibrations, the vibration modes in the circumferential direction being preferred, in particular. These resonance phenomena can in part break off abruptly and likewise start up again abruptly. If, for example, a sliding mean magnitude $\overline{A}_s(f_{1,i},t)$ that is formed by a simple averaging as an arithmetic mean from a number of prior magnitudes, is used as a basis for the method disclosed in international patent disclosure WO 03/071243, which is expressly a constituent part of the present patent application, it has emerged that these noise fluctuations can lead to erroneous triggering. In order to avoid instances of such erroneous triggering, monitoring for pulse-type mechanical effects is therefore suppressed in practice during the humming of the turbine, which is detected by analyzing the signal characteristic.

In other system parts, as well, for example in a reactor pressure vessel of a nuclear power plant, operationally induced short-term operating noises are superposed on the continuous basic noises (fluid flow, pump noise), as caused, for example, by permissible changes in the operating conditions and intentional interventions in the operating sequence (actuation of valves, movement of control rods).

In the case of an iterative calculating method particularly suitable for system parts with relatively slow changes in state, the mean magnitude $\overline{A}_s$ and a mean quadratic deviation (variance) are determined for each frequency $f_{1,i}$ in a sliding fashion with the aid of the relationships $$\overline{A}_s(f_{1,i},t+\delta t)=k\overline{A}_s(f_{1,i},t)+(1-k)A_{1,s}(f_{1,i},t+\delta t_1)$$

$$var(A_{1,s}(f_{1,i},t+\delta t1))=$$

$$kvar(A_{1,s}(f_{1,i},t))+(1-k)(A_{1,s}(f_{1,i},t+\delta t1)-\overline{A}_s(f_{1,i},t))^2,$$

$\delta t1$ being the first time step in which the first magnitude $A_{1,s}$ is respectively calculated for a first time window $\Delta t_1$. By selecting the parameter k, it is now determined to what extent a first magnitude $A_{1,s}(f_{1,i},t+\delta t_1)$ being added thereto influences the newly calculated mean magnitude $\overline{A}_s(f_{1,i},t+\delta t_1)$. This approach corresponds to an exponentially weighted averaging, k determining the adaptation rate. In the event of a sudden change in the magnitude $A_{1,s}(f_i,t)$ from a constant initial value to a likewise constant new value, there would then be an approximately exponential adaptation of the new mean magnitude $\overline{A}_s$ to the new, currently present magnitude $A_{1,s}$ with a time constant $\tau=\delta t_1/(1-k)$. For k=0.999 and $\delta t_1$=3.2 ms, there is a time constant $\tau$ of 3.2 s. Such a mode of procedure is suitable, for example, for monitoring the operating noises of a nuclear reactor pressure vessel.

For monitoring system parts in which very fast changes in state are observed, for example in the case of turbines, a calculating method has proved to be particularly suitable in the case of which the mean magnitude $\overline{A}_s(f_{1,i},t)$ is determined temporally in a sliding fashion in time steps $\delta t1$ as a function of the time t from a data record $A_{1,s}(f_{1,i},t)$, assembled from M first magnitudes $A_{1,s}(f_{1,i},t_m)$ of a time segment T and illustrated in FIG. 3, with the aid of the relationship $$\overline{A}_s(f_{1,i},t)=(Q_{\alpha,s}(f_{1,i},t)+Q_{1-\alpha,s}(f_{1,i},t))/2,$$

wherein $Q_{\alpha,s}$ and $Q_{1-\alpha,s}$ are the $\alpha$ and $(1-\alpha)$ quantiles of the first magnitudes $A_{1,s}(f_{1,i},tm)$ relatively determined in a time segment T, where $tm=t+m\delta t_1$ and m is a whole number. To this end, the first magnitudes $A_{1,s}(f_i,t_m)$ associated with this time segment T, arranged by way of example symmetrically in relation to the instant t (it holding in this case that $$-\frac{M-1}{2} \leq m \leq \frac{M-1}{2}$$

and M is odd), and respectively forming the data record $A_{1,s}(f_i,t)$ assigned to the instant t are sorted in a sequence by value of the magnitude. The $\alpha$ or $(1-\alpha)$ quantile is then that value of the magnitude which is located at the position $\alpha$ or $(1-\alpha)M$ of the sequence. In practice, values are set between $0.7 \leq \alpha \leq 0.8$, preferably $\alpha$=0.75 for $\alpha$.

The $\alpha$ and $(1-\alpha)$ quantiles, $Q_{\alpha,s}$ and $Q_{1-\alpha,s}$, respectively, are now used to calculate a mean deviation $s_s(f_{1,i},t)$ of the first magnitudes $A_{1,s}(f_{1,i},t_n)$ from the mean magnitude $\overline{A}_s(f_{1,i},t)$, by using the relationship $$s_s(f_{1,i,t}) = \sqrt{\frac{Q_{\alpha,s}(f_{1,i},t) - Q_{1-\alpha,s}(f_{1,i},t)}{2q_{1-\alpha,s}}},$$

$q1-\alpha,s$ being the $(1-\alpha)$ quantile of the normalized Gaussian distribution.

This calculating method (quantile method) can therefore be used to calculate the mean and deviation of a data record without taking account of the values that are located outside the ranges defined by $\alpha$ and $(1-\alpha)$. Therefore substantially higher magnitudes such as can occur in an additionally amplified fashion from a superposed burst signal are not taken into account, and thus also cannot corrupt the result. This method can be used in conjunction with the same quality of the result of calculation to select a substantially shorter time segment, for example a data record $A_s(f_{1,i},t)$ including M=100 first values of the magnitude $A_{1,s}(f_{1,i},t)$ and having a length of T=320 ms for the time segment for a time step δt1=3.2 ms. Consequently, the mean magnitude $\overline{A}_s(f_{1,i},t)$ is adapted to rapid changes in the operating background so that these are unable to lead to corruption of the normalized spectra or to appear as erroneous displays in the monitoring. It is possible in the case of such a mode of procedure for the striking of loose parts to be detected even during the humming of a gas turbine, that is to say when sympathetic vibrations in the combustion chamber give rise to substantially higher background noises very abruptly, for example with a time constant of approximately 0.5 s in association with an amplitude rise by a factor of 5 and more.

The existing calculated mean magnitude $\overline{A}_s(f_{1,i},t)$ and the mean deviation $s(f_{1,i},t)$ can now be used in a further computing step to determine on the basis of the quantile method an improved mean magnitude $\overline{A}_{opt,s}(f_{1,i},t)$ by eliminating from the respectively present data record $A_s(f_{1,i},t)$ those first magnitudes $A_{1,s}(f_{1,i},t_m)$ that are significantly greater than the previously calculated mean magnitude $\overline{A}_s(f_{1,i},t)$. In practice, it has proved to be advantageous in this case when calculating the mean to eliminate those first magnitudes $A_{1,s}(f_{1,i},t_m)$ that are greater than $\overline{A}_s(f_{1,i},t)+3s_s(f_{1,i},t)$. With the complete data record $A_s(f_{1,i},t)$, a renewed calculation of mean is then carried out with the aid of a δ or (1−δ) quantile, in which case $$\delta = \alpha(M - M_E)/M$$

holds, and $M_E$ is the number of the first magnitudes $A_{1,s}(f_{1,i},tm)$ that are greater than $\overline{A}_s(f_{1,i},t)+3s_s(f_{1,i},t)$. As an alternative thereto, it is also possible and mathematically identical to determine the α and (1−α) quantile anew with the aid of a data record reduced by these magnitudes. With the aid of these δ and (1−δ) quantiles, or of the α and (1−α) quantiles obtained with the reduced data record, an improved mean $\overline{A}_{opt,s}(f_{1,i},t)$ or an improved mean deviation $s_{opt,s}(f_{1,i},t)$ is now calculated in accordance with the above-named formula.

With the aid of the above calculated mean magnitudes $\overline{A}_s(f_i,t)$ or $\overline{A}_{opt,s}(f_i,t)$ and of the mean deviation $s_s(f_i,t)$ or $s_{opt,s}(f_i,t)$, a normalized deviation $D_s(f_i,t)$ of the first magnitude $A_{1,s}$ from the mean $\overline{A}_s$ is now calculated in accordance with the following equation:

$$D_s(f_{1,i},t_m) = (A_{1,s}(f_{1,i},t_m) - \overline{A}_s(f_{1,i},t))/s_s(f_{1,i},t) \text{ or}$$

$$D_s(f_{1,i},t_m) = (A_{1,s}(f_{1,i},t_m) - \overline{A}_{opt,s}(f_{1,i},t))/s_{opt,s}(f_{1,i},t).$$

The first magnitudes $A_{1,s}(f_{1,i},t_m)$ of M spectra are evaluated in order to determine the mean magnitude $\overline{A}_s(f_{1,i},t)$ valid at the instant t and the mean deviation $s_s(f_{1,i},t)$ valid at this instant t. In other words: both the mean magnitude $\overline{A}_s(f_{1,i},t)$ or $\overline{A}_{opt,s}(f_{1,i},t)$ and the mean deviation $s_s(f_{1,i},t)$ or $s_{opt,s}(f_{1,i},t)$ are constantly updated with the aid of M transformations. This updating is performed in first time steps δt1. The data record $A_{1,s}(t+\delta t_1)$ forming the basis of the calculation of the new mean magnitude $\overline{A}_s(f_{1,i},t+\delta t_1)$ or $\overline{A}_{opt,s}(f_{1,i},t+\delta t_1)$ and of the new mean deviation $s_s(f_{1,i},t+\delta t_1)$ or $s_{opt,s}(f_{1,i},t+\delta t_1)$ is formed in this case by deleting the first (oldest) magnitude and adding the newest magnitude. In the case of a time segment T arranged symmetrically relative to the instant t, these are the first magnitudes $$A_{1,s}\left(f_{1,i}, t - \frac{M-1}{2}\delta t_1\right) \text{ and } A_{1,s}\left(f_{1,i}, t + \frac{M-1}{2} \leq \delta t_1\right).$$

In an advantageous refinement, the normalized deviation $D_s(t,f_1,i)$ is additionally averaged in a frequency range $f_{1,i-L}$, $f_{1,i-L+1}, \ldots f_{1,i+L}$ surrounding the frequency $f_{1,i}$ and consisting of 2 L+1 frequencies, and a mean normalized deviation $\overline{D}_s(f_{1,i},t)$ is determined by the equation $$\overline{D}_s(f_{1,i}, t) = \frac{1}{1+2L} \sum_{k=-L}^{k=+L} D_s(f_{1,i+k}, t).$$

This additional computing step leads to a reduction in the level and breadth of fluctuation of normalized deviation in the ranges in which only background signals are present. The useful signal components are not markedly varied by the averaging in the frequency range, since they always occur in a fashion concentrated about neighboring frequency lines. This measure results once more in an improvement to the signal/background ratio by a further 10 to 15 dB.

A further improvement in the signal/background ratio is achieved when a threshold value $D_{0,s}$ is additionally introduced, and a normalized deviation $\overline{D}_{v,s}(f_{1,i},t)$ is determined with the aid of the relationship $\overline{D}_{v,s} = D_{0,s}$ for $\overline{D}_s < D_{0,s}$ and $\overline{D}_{v,s} = \overline{D}_s$ for $\overline{D}_s \geq D_{0,s}$.

The normalized deviations $D_a(f_{1,i},t)$, $\overline{D}_s(f_{1,i},t)$ or $\overline{D}_{v,s}(f_{1,i},t)$ determined in this way are squared and summed through all the discrete frequencies $f_i$:

$$S_s(t) = \sum_{i=1}^{N} D_s(f_{1,i}, t)^2 / N \tag{a}$$

$$S_s(t) = \sum_{i=1}^{N} \overline{D}_s(f_{1,i}, t)^2 / N \text{ or} \tag{b}$$

$$S_s(t) = \sum_{i=1}^{N} \overline{D}_{v,s}(f_{1,i}, t)^2 / N. \tag{c}$$

A first evaluation function $K_{1,s}(t)$ is now derived from this sum $S_s(t)$ by extracting the root:

$$K_{1,s}(t) = \sqrt{S_s(t)} \tag{1}.$$

The latter serves as indicator for the occurrence of an impact. As an alternative to this, it is also possible for the evaluation function to be formed by calculating the difference between the root of the sum $S_s(t)$ and a sliding time mean of this root $$\tilde{K}_{1,s}(t) = K_{1,s}(t) - \overline{K}_{1,s}(t) \tag{2},$$

and for it to serve as characteristic for the occurrence of an impact. If $K_{1,s}(t)$ or $\tilde{K}_{1,s}(t)$ overshoots a first threshold value $K_{1,0}$ (alarm threshold), which is between 1.5 and 2 for gas turbines, this constitutes an indication for the impact of a loose part. The following explanations are now based by way of example on evaluation functions K calculated using equation (1).

The accuracy with which the instant $t_s$ at which the event occurs, and thus the propagation time differences, can be determined for each of the sensors depends substantially on the rise rate of the first evaluation function $K_{1,s}$. The rise of the first evaluation function $K_{1,s}$ is, however, slower the larger the first time window $\Delta t_1$.

Figures 5, 6:
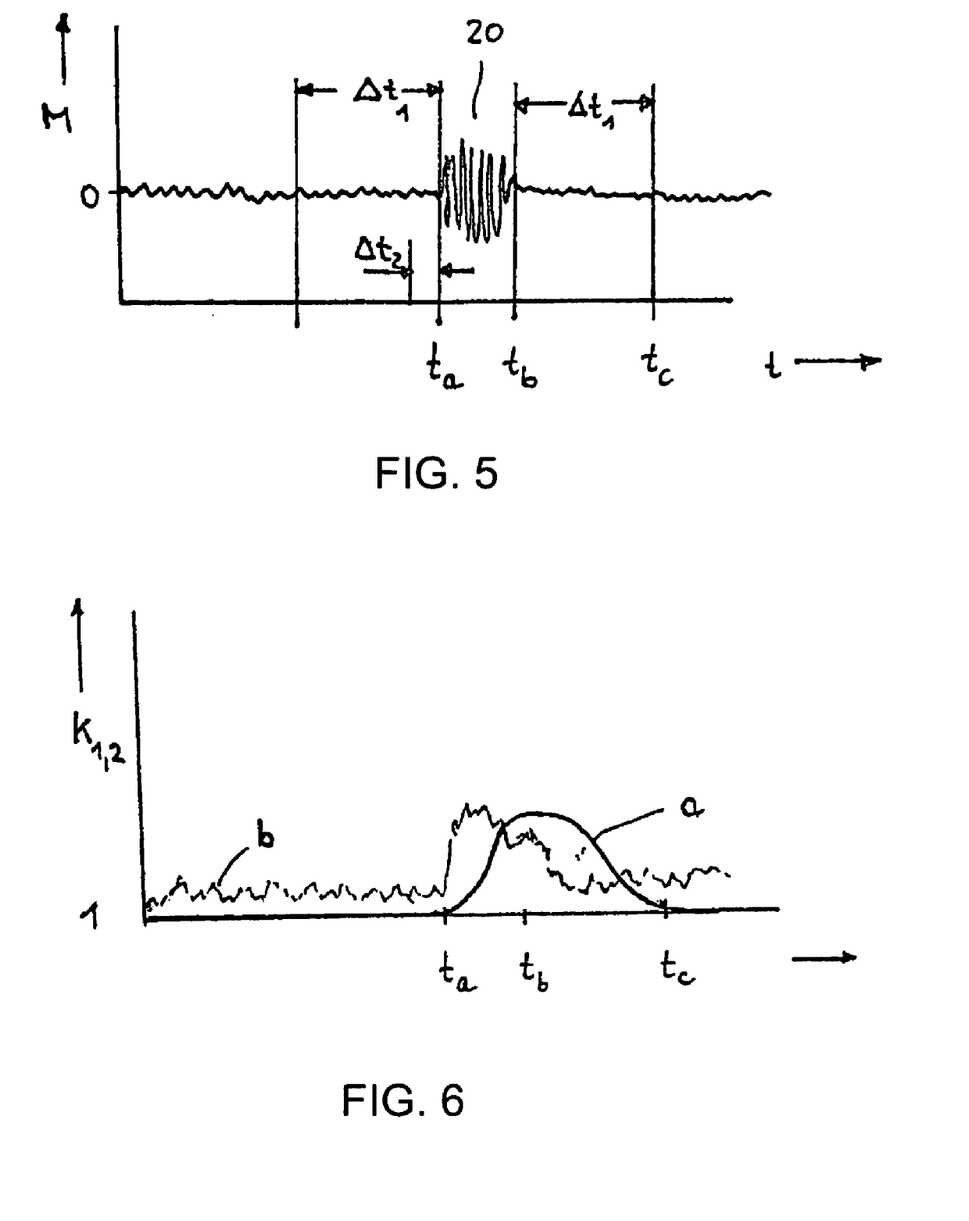
FIG. 5 is a graph in which an idealized measurement signal M having a burst which can be directly detected in the measurement signal is plotted against time t.
FIG. 6 is a graph in which evaluation functions $K_1$ and $K_2$ determined from the measurement signal in accordance with FIG. 5 with the aid of different time windows are plotted against time t.
Figure 7A:
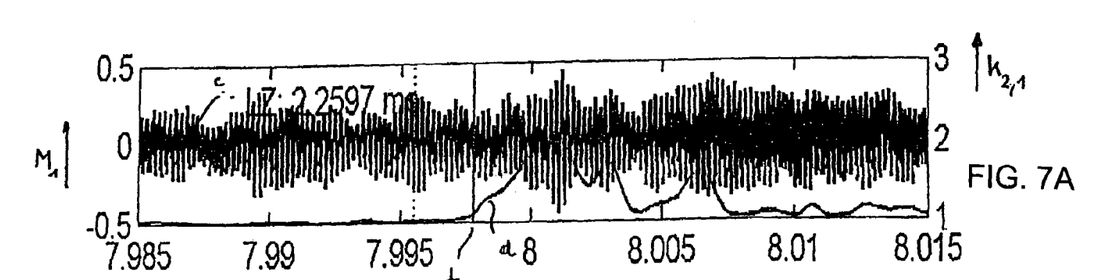
FIGS. 7A-7F are graphs in which there are plotted against time t the operating noise (measurement signal M), respectively detected by sensors arranged at different positions, of a system part during the presence of a foreign effect, and the evaluation function ($K_2$) determined with the aid of the method in accordance with the invention and using a second time window.
Figure 7B:
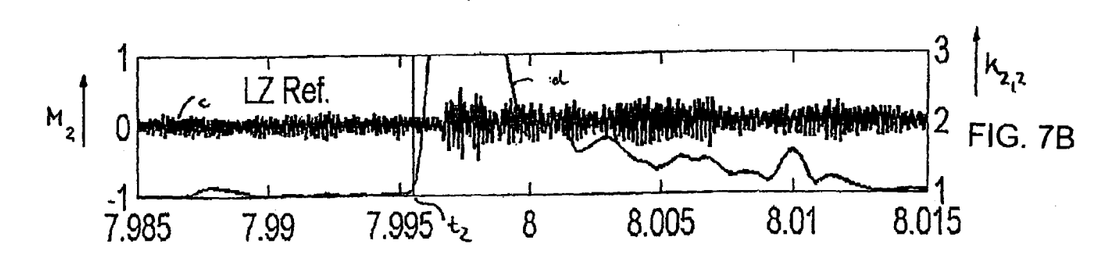
Figure 7C:
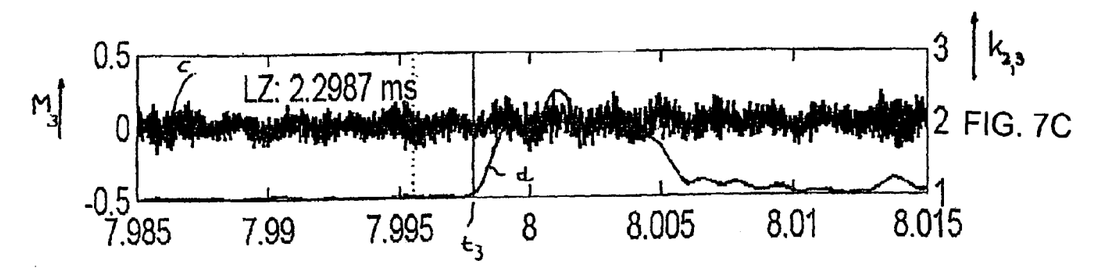
Figure 7D:
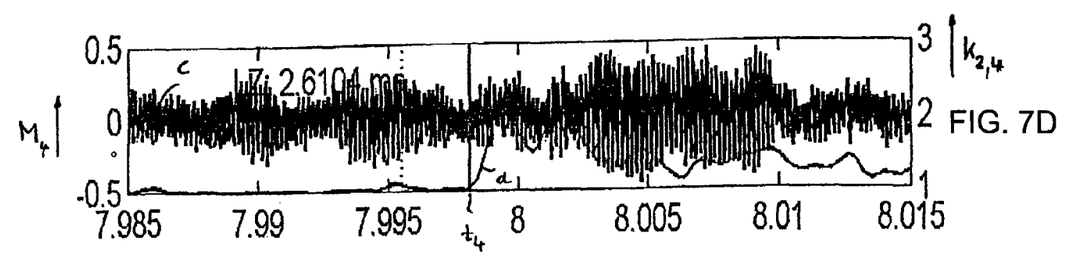
Figure 7E:
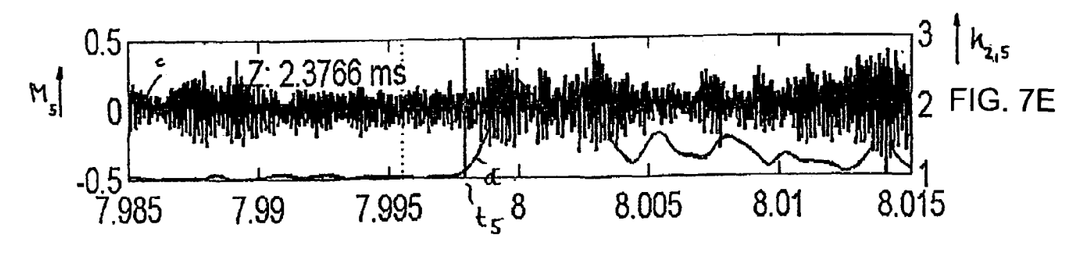
Figure 7F:
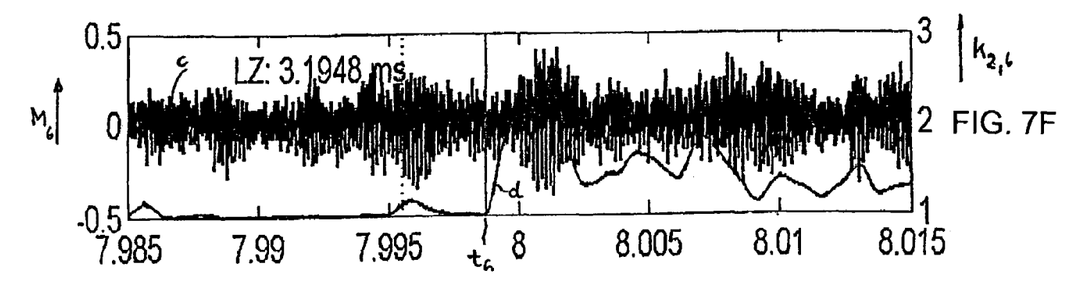

This is illustrated in FIGS. 5 and 6 for a measuring channel. Plotted in FIG. 5 against time t is an idealized measurement signal M on which a burst 20 in the time interval $t_a$ to $t_b$ is superposed. FIG. 6 shows an idealized diagram in which a first and second evaluation function $K_1$ (curve a) and $K_2$ (curve b), respectively, are plotted against time t; these have been derived from the measurement signal M of FIG. 5 with the aid of a different first and second time window $\Delta t_1$ and $\Delta t_2$, lying within the time range $T_s$. If the first evaluation function $K_1$ is now determined in a first time window $\Delta t_1$ in which the burst 20 has not yet begun, in the ideal case $K_1=1$ results (when $\tilde{K}_1$ is used instead of $K_1$ as first evaluation function, in the ideal case $\overline{K}_1=0$ results). The first time window $\Delta t_1$ now migrates to the right in first time steps $\delta t_1$, and the burst 20 is successively detected by the first time window $\Delta t_1$ such that in the event of a Fourier transformation the frequency components contained in the burst 20 increasingly play a greater role in the calculation of the first evaluation function $K_1$. If the first time window $\Delta t_1$ now reaches the end of the burst 20 at the instant $t_b$ with its right-hand edge, the burst 20 lies completely inside this first time window $\Delta t_1$, and so the first evaluation function $K_1$ has reached its maximum. If the left-hand edge of the first time window $\Delta t_1$ then coincides with the end of the burst 20, the first evaluation function $K_1$ drops to 1 again. On the basis of the width of the first time window $\Delta t_1$, which corresponds at least to the width of a burst 20 to be expected, the rise in the first evaluation function $K_1$ will take place relatively slowly in a time window $t_a$ to $t_b$, as is reproduced in curve a of FIG. 6. A second time window $\Delta t_2$ is depicted in FIG. 5, and is significantly smaller than the first time window $\Delta t_1$. The second time window $\Delta t_2$ is now used to calculate the second evaluation function $K_2$ in second, shorter time steps $\delta t_2 < \delta t_1$ with the aid of the same algorithms, explained above for the calculation of the first evaluation function $K_1$, and by using second frequencies $f_{2,i}$ (parameters) adapted to the shorter, second time window $\Delta t_2$. Since both the second time window $\Delta t_2$ and the second time steps $\delta t_2$ are shorter than the first time window $\Delta t_1$ and the first time steps $\delta t 1$, respectively, the evaluation function rises significantly faster than the first evaluation function $K_1$ and already reaches its maximum in a significantly shorter period that, in the example of the figure, corresponds approximately to the length of the second time window $\Delta t_2$, as is to be seen from curve b of FIG. 6. It is also illustrated in this figure that the second evaluation function $K_2$ calculated with the aid of the second, shorter time window $\Delta t_2$ has a significantly higher noise because of the smaller data volume on which the Fourier transformation is based.

The frequency spectrum contains fewer discrete frequencies, owing to the smaller time window $\Delta t_2$. In other words: the second magnitudes $A_{2,s}(f_{2,i},t)$ are present for fewer second frequencies $f_{2,i}$, the set of the second frequencies $f_{2,i}$ being, however, a subset of the set of the first frequencies $f_{1,i}$.

The first evaluation function $K_{1,s}(t)$ calculated with the aid of the above-named algorithms for all the measuring channels is now used to monitor all the measuring channels for the occurrence of a burst with a very high sensitivity, it being accepted that the beginning of the burst in the individual channels can be determined only with low accuracy.

If a burst is now ascertained in one of the measuring channels at a triggering instant to (rise in the first evaluation function $K_1$,s over a first threshold value $>K_{1,0}$), there is triggered a triggering signal that respectively freezes the measurement signals stored in all the channels for approximately 10 s in a time range TS that lies approximately symmetrically about the instant $t_0$ of the triggering signal (pre-triggering). Second evaluation functions $K_{2,s}(t)$ are then respectively calculated for all the channels using the above-named algorithms, this calculation being based, however, on the mean magnitudes $\overline{A}_s(f_{2,i},t_0)$ and standard deviations $s_s(f_{2,i},t_0)$ determined shortly before or at the triggering instant t0 from the first magnitudes $A_{1,s}(f_{1,i},t)$ and valid for the second frequencies $f_{2,i}$. This is possible since after the triggering instant no superposed burst signal is present, and thus these values represent the pure operating background, it being assumed, moreover, that the operating background does not change significantly in the short time thereafter during the burst.

FIGS. 7A-7F now show the measurement signal $M_s$ ($M_{1-6}$) (curves c) respectively detected by a sensor $4_s$ ($4_{1-6}$) at a nuclear reactor pressure vessel at different measuring positions for a period of approximately 30 ms. It may now be gathered directly from the diagrams that the occurrence of an event can possibly be identified in the measurement signal $M_2$ in the diagram in accordance with FIG. 7B without it thereby being possible, however, to gather directly from the measurement signal whether what is involved is a transition of the operating state, or a pulse-type event that is to be ascribed to an impact of a loose part.

The second evaluation function $K_{2,s}(t)$ obtained with the aid of one of the above methods is respectively plotted as a continuous curve d in the FIGS. 7A-7F. In the example illustrated, the second evaluation function $K_{2,s}(t)$ was calculated using the iterative method. It may be seen in the figures that the second evaluation function $K_{2,s}(t)$ respectively exhibits a significant rise at different instants $t_s=t_1$ to $t_6$. These instants $t_s$ can be determined, for example, as those instants at which the second evaluation functions $K_{2,s}(t)$ respectively overshoot a prescribed second threshold value $K_{2,0}$. If these instants $t_s$ are known, it is possible not only to reliably detect the occurrence of a pulse-type event, but it is also possible, given a known sensor location, to infer the location of the impact from the propagation time differences LZ $t_1$-$t_2$, $t_1$-$t_3$, . . . (in the example, $t_1$-$t_2$, $t_3$-$t_2$, $t_4$-$t_2$, $t_5$-$t_2$ and $t_6$-$t_2$).

The second evaluation function $K_{2,s}$ calculated in this way for each of the measuring channels is used in a next step to calculate more accurately the instants $t_s$ at which the burst signal caused by the pulse-type effect occurs at the location of the respective sensor $4_s$. This more accurate calculation is explained below with the aid of the diagrams illustrated in FIGS. 8 and 9.

Figure 8:
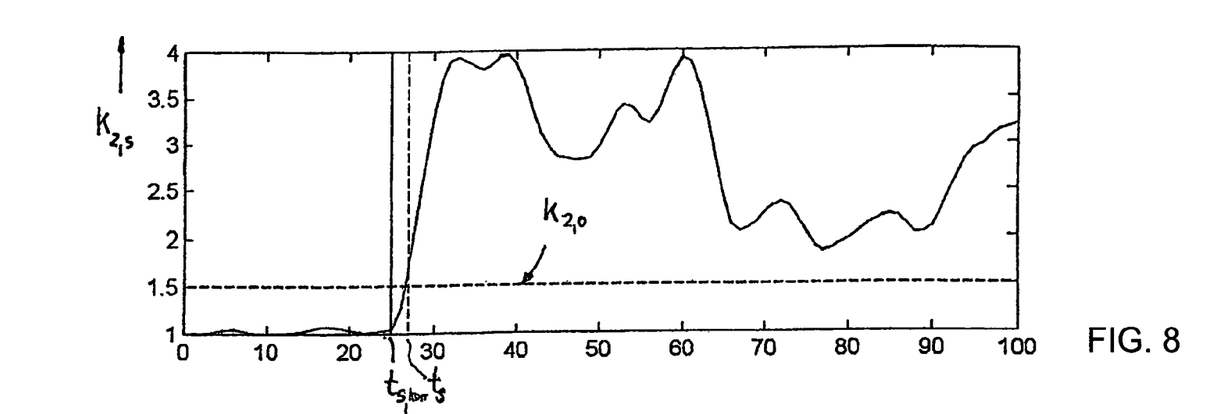
FIGS. 8 and 9 respectively are graphs in which there is plotted against time t the evaluation function $K_2$ determined for a sensor with a second time window, and the time derivative $dK_2/dt$ thereof.
Figure 9:
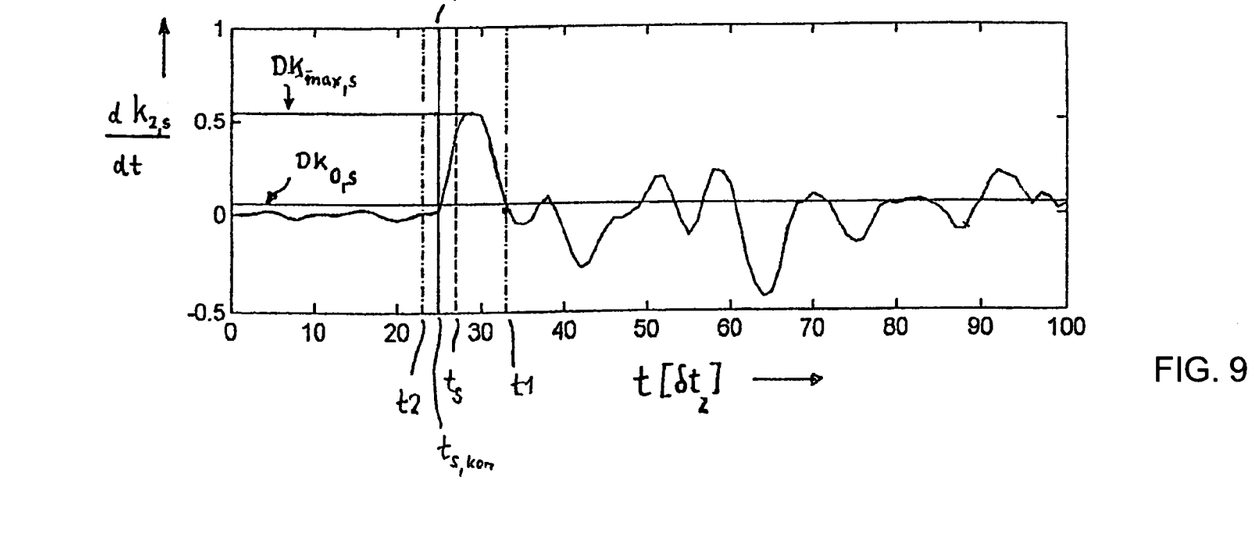

FIG. 8 shows the typical profile of a second evaluation function $K_{2,s}$ (second time step $\delta t_2=0.16$ ms, second time window $\Delta t_2=2.56$ ms) calculated in this way. This second evaluation function $K_{2,s}$ overshoots a second threshold value $K_{2,0}$ at an instant $t_s$. The rise in the second evaluation function $K_{2,s}$ is assigned to a burst on the basis of this first threshold value $K_{1,0}$. The second evaluation function $K_{2,s}$ is now differentiated with respect to time t. The corresponding differential quotient $dK_{2,s}/dt$ is plotted against time in FIG. 9 as a curve. Starting from the instant $t_s$, an attempt is now made to find the instant on this curve at which the differential quotient vanishes, that is to say the second evaluation function $K_{2,s}$ reaches the first local maximum. This is the case at the instant $t_1$. An instant $t_2 < t_1$ is now determined at which the curve reaches the value 0. There is now determined in this range $t_2$ to $t_1$ the maximum $DK_{max,s}$ that specifies the largest gradient of the second evaluation function $K_{2,s}$. This maximum $DK_{max,s}$ is now used to calculate a difference threshold value $DK_{0,s}$ with the aid of the relationship $DK_{0,s}=\beta DK_{max,s}$, $\beta$ being a value between 0.05 and 0.2. The instant $t_{s,korr}$ at which the first derivative $dK_2,s/dt$ in the time interval $t_2$-$t_1$ overshoots this difference threshold value $DK_{0,s}$ for the first time is now used as corrected instant for the calculation of the propagation time differences. An exact determination of the propagation times is possible in this way.

The invention claimed is:

1. A method for detecting a location of a pulse-type mechanical effect on a system part, which comprises the steps of:
   detecting an operating noise present in the system part continuously by a plurality of sensors disposed on the system part and being converted by the sensors into measurement signals;
   storing the measurement signals in time intervals for a time range;
   determining a first magnitude of a transform of each of the measurement signals with an aid of prescribed first parameters of a mathematical transformation rule in first time windows that are temporally sequential in first time steps and lie within the time range;
   deriving a first evaluation function for each of the first time steps from the first magnitudes determined for each of the prescribed first parameters resulting in a plurality of first evaluation functions;
   comparing the first evaluation functions respectively with a first threshold value, and an overshooting of the first threshold value by at least one of the first evaluation functions at a triggering instant is valued as an index for a presence of a pulse-type signal component indicating the mechanical effect;
   determining second evaluation functions with an aid of prescribed second parameters of the mathematical transformation rule and with the same algorithms in second time windows that are temporally sequential in second time steps and lie within the time range, and which are smaller than the first time windows; and
   determining the location of an effect from instants at which the second evaluation functions respectively fulfill a prescribed criterion, and from propagation time differences resulting therefrom.

2. The method according to claim 1, which further comprises setting the second time steps to be shorter than the first time steps.

3. The method according to claim 1, which further comprises determining for each of the first time steps and each of the prescribed first parameters, a deviation of the first magnitudes from a first mean magnitude, and a mean deviation assigned to this from which the first evaluation function is derived for each of the prescribed first parameters and for each of the first time steps, and in which a calculation of the second evaluation function is based both on a second mean magnitude valid for the triggering instant for the prescribed second parameters and on the mean deviation assigned to said second mean magnitude.

4. The method according to claim 1, wherein the prescribed criterion is fulfilled with the second evaluation functions respectively overshooting a second threshold value.

5. The method according to claim 1, wherein the prescribed criterion is fulfilled when a first derivative of the second evaluation function overshoots a difference threshold value.

6. The method according to claim 5, which further comprises deriving the difference threshold value from a maximum gradient of a rising edge of the second evaluation function.

7. The method according to claim 6, which further comprises determining the difference threshold value with an aid of relationship $DK_{0,s} = \beta DK_{max,s}$, in which case $0.05 \leq \beta \leq 0.2$.

8. A device for detecting a location of a pulse-type mechanical effect on a system part, the device comprising:
   a plurality of sensors disposed on the system part, for continuously detecting and measuring an operating noise present in the system part;
   at least one A/D converter, connected downstream of said sensors, for digitizing measurement signals detected by said sensors; and
   an arithmetic unit connected to and receiving the digitized measurement signals from said A/D converter, said arithmetic unit programmed to:
      store the measurement signals respectively in time intervals for a time range;
      determine a first magnitude of a transform of each of the measurement signals with an aid of said of prescribed first parameters of a mathematical transformation rule in first time windows that are temporally sequential in first time steps and lie within the time range;
      derive a first evaluation function respectively for each of the first time step from the first magnitude determined for each of the prescribed first parameters resulting in first evaluation functions;
      compare the first evaluation functions respectively with a first threshold value, and an overshooting of the first threshold value by at least one of the first evaluation functions at a triggering instant is valued as an index for a presence of a pulse-type signal component indicating the mechanical effect;
      determine second evaluation functions with an aid of prescribed second parameters of the mathematical transformation rule and with the same algorithms in second time windows that are temporally sequential in second time steps and lie within the time range, and which are smaller than the first time windows; and
      determine the location of an effect from instants at which the second evaluation functions respectively fulfill a prescribed criterion, and from propagation time differences resulting therefrom.

9. The device according to claim 8, wherein said arithmetic unit is further programmed to set the second time steps to be shorter than the first time steps.

10. The device according to claim 8, wherein said arithmetic unit is further programmed to determine for each of the first time steps and each of the prescribed first parameters a deviation of the first magnitudes from a first mean magnitude, and a mean deviation assigned to this from which the first evaluation function is derived for each of the prescribed first parameters and for each of the first time steps, and in which a calculation of the second evaluation function is based both on a second mean magnitude valid for the triggering instant for the prescribed second parameters and on the mean deviation assigned to said second mean magnitude.

11. The device according to claim 8, wherein the prescribed criterion is fulfilled with the second evaluation functions respectively overshooting a second threshold value.

12. The device according to claim 8, wherein the prescribed criterion is fulfilled when a first derivative of the second evaluation function overshoots a difference threshold value.

13. The device according to claim 12, wherein said arithmetic unit is further programmed to derive the difference threshold value from a maximum gradient of a rising edge of the second evaluation function.

14. The device according to claim 8, wherein said arithmetic unit is further programmed to determine the difference threshold value with an aid of relationship $DK_{0,s} = \beta DK_{max,s}$, in which case $0.05 \leq \beta \leq 0.2$.

* * * * *